(12) United States Patent
Dolby et al.

(10) Patent No.: US 10,884,832 B2
(45) Date of Patent: Jan. 5, 2021

(54) AGGREGATION MESSAGING WITHIN AN INTEGRATION ENVIRONMENT

(71) Applicant: International Business Machines Corporation, Armonk, NY (US)

(72) Inventors: Trevor Clifford Dolby, Winchester (GB); John A. Reeve, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/365,187

(22) Filed: Mar. 26, 2019

(65) Prior Publication Data

US 2020/0310895 A1 Oct. 1, 2020

(51) Int. Cl.
  *G06F 9/44* (2018.01)
  *G06F 9/54* (2006.01)
  *G06F 9/50* (2006.01)
  *G06F 9/52* (2006.01)

(52) U.S. Cl.
  CPC ............ *G06F 9/546* (2013.01); *G06F 9/5027* (2013.01); *G06F 9/526* (2013.01)

(58) Field of Classification Search
  CPC .................................................... G06F 9/546
  USPC ......................................................... 719/313
  See application file for complete search history.

(56) References Cited

U.S. PATENT DOCUMENTS

| | | | |
|---|---|---|---|
| 8,239,871 B2 | 8/2012 | Ogasawara | |
| 8,417,681 B1 | 4/2013 | Miloushev et al. | |
| 9,128,749 B1 | 9/2015 | Wang et al. | |
| 9,213,586 B2 | 12/2015 | Shorb | |
| 9,942,339 B1 | 4/2018 | Milyakov | |
| 2014/0032535 A1 | 1/2014 | Singla | |

OTHER PUBLICATIONS

Aghazadeh et al., "On the Time and Complexity of ABA Prevention and Detection," (PODC '15) Proceedings of the 2015 ACM Symposium on Principles of Distributed Computing, 2015, 29 pgs.

Gangwani et al., "CASPAR: Breaking Serialization in Lock-Free Multicore Synchronization," ASPLOS '16, Apr. 2-6, 2016, Atlanta, Georgia, USA. Copyright is held by the owner/author(s). Publication rights licensed to ACM, http://dx.doi.org/10.1145/2872362, pp. 789-804.

Gulisano et al., "Efficient Data Streaming Multiway Aggregation Through Algorithmic Designs and New Abstract Data Types," Computer Science, Data Structures and Algorithms, https://arxiv.org/abs/1606.04746, Jun. 15, 2016, printed Feb. 7, 2019, https://arxiv.org/abs/1606.04746, 3 pgs.

(Continued)

*Primary Examiner* — Timothy A Mudrick
(74) *Attorney, Agent, or Firm* — Peter K. Suchecki

(57) ABSTRACT

Provided is an apparatus, method and computer program product for executing an aggregation method in an integration environment comprising: issuing, in response to receiving an input message from a requesting application, a first control signal, using, in response to receiving the first control signal, a single logical thread to: generate an entry associated with an in-memory data structure, wherein the entry comprises: an aggregation identifier associated with the input message and a response identifier associated with a response message associated with a target application; update, in response to receiving the response message from the target application, the entry with the response message; and add the updated entry to the in-memory data structure.

20 Claims, 8 Drawing Sheets

(56) References Cited

OTHER PUBLICATIONS

IBM, "A Messaging Based Implementation for Aggregation," http://priorart.ip.com/IPCOM/000135827, Apr. 25, 2006, IP.com No. IPCOM000135827D, 9 pgs.

IBM et al., "Enhanced Implementation of Compare-and-Swap," Original Publication Date: Nov. 1, 1993, Original Disclosure Information: TDB v36 n11 Nov. 1993 p. 595-598, IP.com No. IPCOM000106578D, IP.com Electronic Publication Date: Mar. 21, 2005.

IBM, "Request Timeout and Reply Correlation in Asynchronous Messaging," http://priorart.ip.com/IPCOM/000029260, IP.com No. IPCOM000029260D, Jun. 21, 2004, 8 pgs.

Kline, M., "What every systems programmer should know about lockless concurrency," Jan. 11, 2017. [Online]. Available: https://assets.bitbashing.io/papers/lockless.pdf, 13 pgs.

Kogan et al., "Wait-Free Queues With Multiple Enqueuers and Dequeuers," PPoPP'11, Feb. 12-16, 2011, San Antonio, Texas, USA. Copyright c 2011 ACM, 11 pgs.

Lindén, J. "Synchronization Techniques in Parallel Discrete Event Simulation," https://uu.diva-portal.org/smash/get/diva2:1183933/FULLTEXT01.pdf, Digital Comprehensive Summaries of Uppsala Dissertations from the Faculty of Science and Technology, © 2018.

Michael, "ABA Prevention Using Single-Word Instructions," IBM T. J. Watson Research Center, RC23089 (WO401-136), Computer Science, Jan. 29, 2004, 6 pgs.

Michael, M. "Hazard Pointers: Safe Memory Reclamation for Lock-Free Objects," IEEE Transactions on Parallel and Distributed Systems, vol. 15, No. 6, Jun. 2004, pp. 491-504.

Shalev et al., "Split-Ordered Lists: Lock-Free Extensible Hash Tables," Journal of the ACM 53(3), pp. 379-405, 2006.

Timnat et al., "Wait-Free Linked-Lists," SIGPLAN Notices 47(8), pp. 309-310, 2012.

Mell et al., "The NIST Definition of Cloud Computing," Recommendations of the National Institute of Standards and Technology, U.S. Department of Commerce, Special Publication 800-145, Sep. 2011, 7 pgs.

AGGREGATION MESSAGING WITHIN AN INTEGRATION ENVIRONMENT

BACKGROUND

The present disclosure relates generally to the field of integration computing between applications, and more specifically, to executing an aggregation method within an integration environment.

In an integration environment, message flows are increasingly used by enterprises to integrate enterprise applications and other applications (e.g., third party applications). An aggregation method, according to one example, comprises generation of a plurality of related requests that are derived from an input message sent by a requesting application and collation of one or more replies to produce an aggregated reply (output) message. Mechanisms for aggregation typically require cross thread locking at a CPU level. Due to multiple requests and responses typically being in flight, multiple threads using mutual-exclusion locks are implemented in order to prevent data from being corrupted. Typically, when a lock is taken, the cost, in terms of CPU and latency, limits the rate at which aggregation can be performed and scaled. Further, if a thread that holds a lock loses access to the CPU, typically, other threads wait for the thread to resume and in the meantime are unable to process messages, which can cause considerable delay.

SUMMARY

Embodiments of the present disclosure include an apparatus for executing an aggregation method in an integration environment. The integration environment, comprising: a processor, responsive to receiving an input message from a requesting application, for issuing a first control signal to an aggregator, wherein the aggregator, responsive to receiving the first control signal, is operable to use a single logical thread to: generate an entry associated with an in-memory data structure, wherein the entry comprises: an aggregation identifier associated with the input message and a response identifier associated with a response message associated with a target application; update, in response to receiving the response message from the target application, the entry with the response message; and add the updated entry to the in-memory data structure.

Another embodiment of the present disclosure includes a computer implemented method for executing an aggregation method in an integration environment, the method comprising: issuing, in response to receiving an input message from a requesting application, a first control signal, using, in response to receiving the first control signal, a single logical thread to: generate an entry associated with an in-memory data structure, wherein the entry comprises: an aggregation identifier associated with the input message and a response identifier associated with a response message associated with a target application; update, in response to receiving the response message from the target application, the entry with the response message; and add the updated entry to the in-memory data structure.

Another embodiment of the present disclosure includes a computer program product comprising a computer readable storage medium having program instructions embodied therewith, for executing an aggregation method in an integration environment, wherein the program instructions are executable by a processor to cause the processor to perform a method comprising: issuing, in response to receiving an input message from a requesting application, a first control signal; using, in response to receiving the first control signal, a single logical thread to: generate an entry associated with an in-memory data structure, wherein the entry comprises: an aggregation identifier associated with the input message and a response identifier associated with a response message associated with a target application; update, in response to receiving the response message from the target application, the entry with the response message; and add the updated entry to the in-memory data structure.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
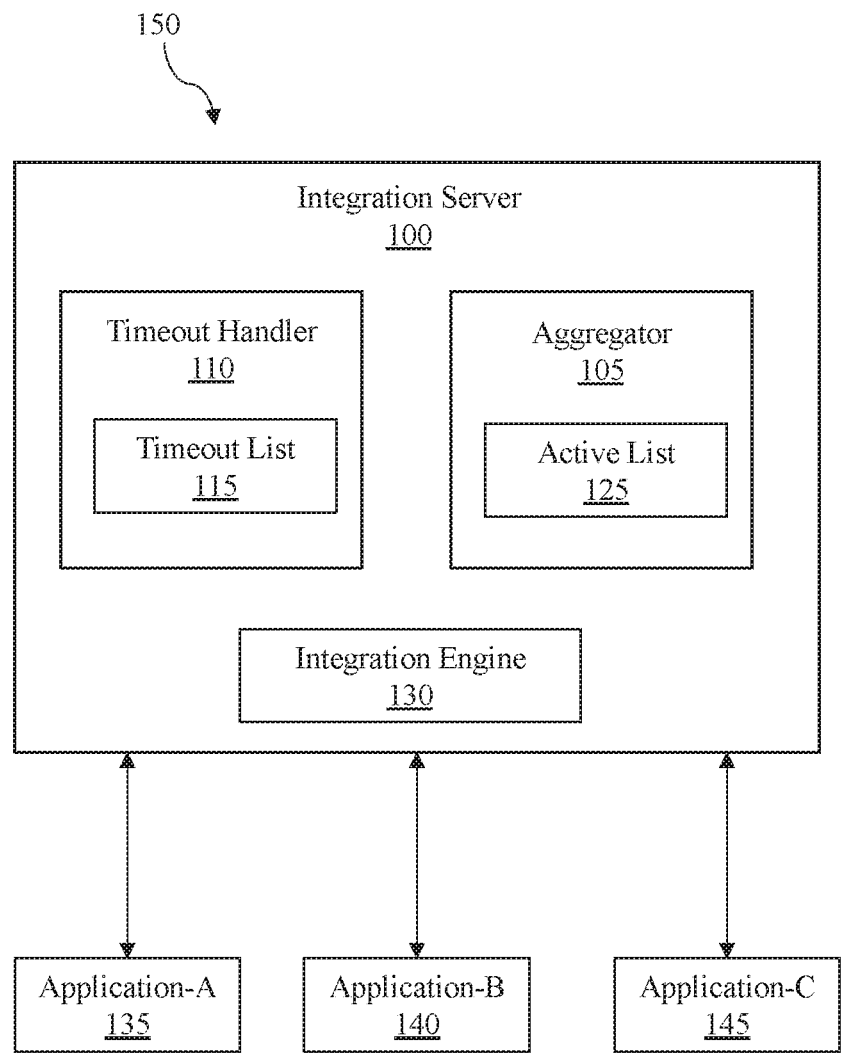
FIG. 1 illustrates a block diagram of an integration system for executing an aggregation method, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of integration computing between applications, and more particularly to executing an aggregation method in an integration environment. While the present disclosure is not necessarily limited to such applications, various aspects of the disclosure may be appreciated through a discussion of various examples using this context.

In an integration environment, message flows are increasingly used by enterprises to integrate enterprise applications and other applications (e.g., third party applications).

A message flow is a sequence of processing steps (typically, termed nodes) that are operable to be executed when an input message is received.

A node is operable to receive a message, perform a set of actions against the message, and optionally, pass the message and/or one or more other messages to the next node in the message flow.

An aggregation method, according to one example, comprises generation of a plurality of related requests that are derived from an input message sent by a requesting application and collation of one or more replies to produce an aggregated reply (output) message.

Typically, the input message (e.g., comprising one or more related request items) is received into a first message flow and is operable to be split by a first node in the first message flow into a number of individual requests.

A second node waits for one or more replies from one or more applications to arrive (or, time out) and combines the replies into the reply message. The second node returns the reply message to the requesting application indicating completion of the aggregation method in the first message flow or in a second message flow. Requests and replies can be issued to applications that are logically separate from the integration environment.

Advantageously, aggregation can help to improve response time because requests can be executed in parallel and non-sequentially.

However, mechanisms for aggregation typically require cross thread locking at a CPU level (e.g., due to the wait/timeout sub-process as described in relation to the second node above). Due to multiple requests and responses typically being in flight, multiple threads using mutual-exclusion locks are implemented in order to prevent data from being corrupted. Typically, when a lock is taken, the cost, in terms of CPU and latency, limits the rate at which aggregation can be performed and scaled.

Further, if a thread that holds a lock loses access to the CPU, typically, other threads wait for the thread to resume and in the meantime are unable to process messages, which can cause considerable delay.

Accordingly, embodiments of the present disclosure provide a method, apparatus and computer program product, for reducing overhead associated with aggregation.

With reference now to FIG. 1, shown is a block diagram of an integration system 150 for executing an aggregation method, in accordance with embodiments of the present disclosure. In the illustrated embodiment, integration system 150 includes one or more applications (Application-A 135, Application-B 140 and Application-C 145) that are operable to communicate with integration server 100. In embodiments, the one or more applications (Application-A 135, Application-B 140 and Application-C 145) may communicate with the integration server 100 via a network (not shown). The network may be a cloud computing network and may be substantially similar to, or the same as, network 50 described in FIGS. 6 and FIG. 7. Integration server 100 includes an integration engine 130 that is operable to run a message flow. The one or more applications (Application-A 135, Application-B 140 and Application-C 145) are operable to request that an aggregation method is executed and are operable to be called by the aggregation method.

In the illustrated embodiment, integration server 100 includes an aggregator 105 comprising a first data structure, termed herein an active list 125. In one embodiment, the aggregator 105 comprises a message flow having a plurality of nodes. There is also provided a timeout handler 110 comprising a second data structure, termed herein a timeout list 115. In embodiments, integration server 100 may be any type of computer system and may be substantially similar to computer system 1101 of FIG. 8.

Figure 4:
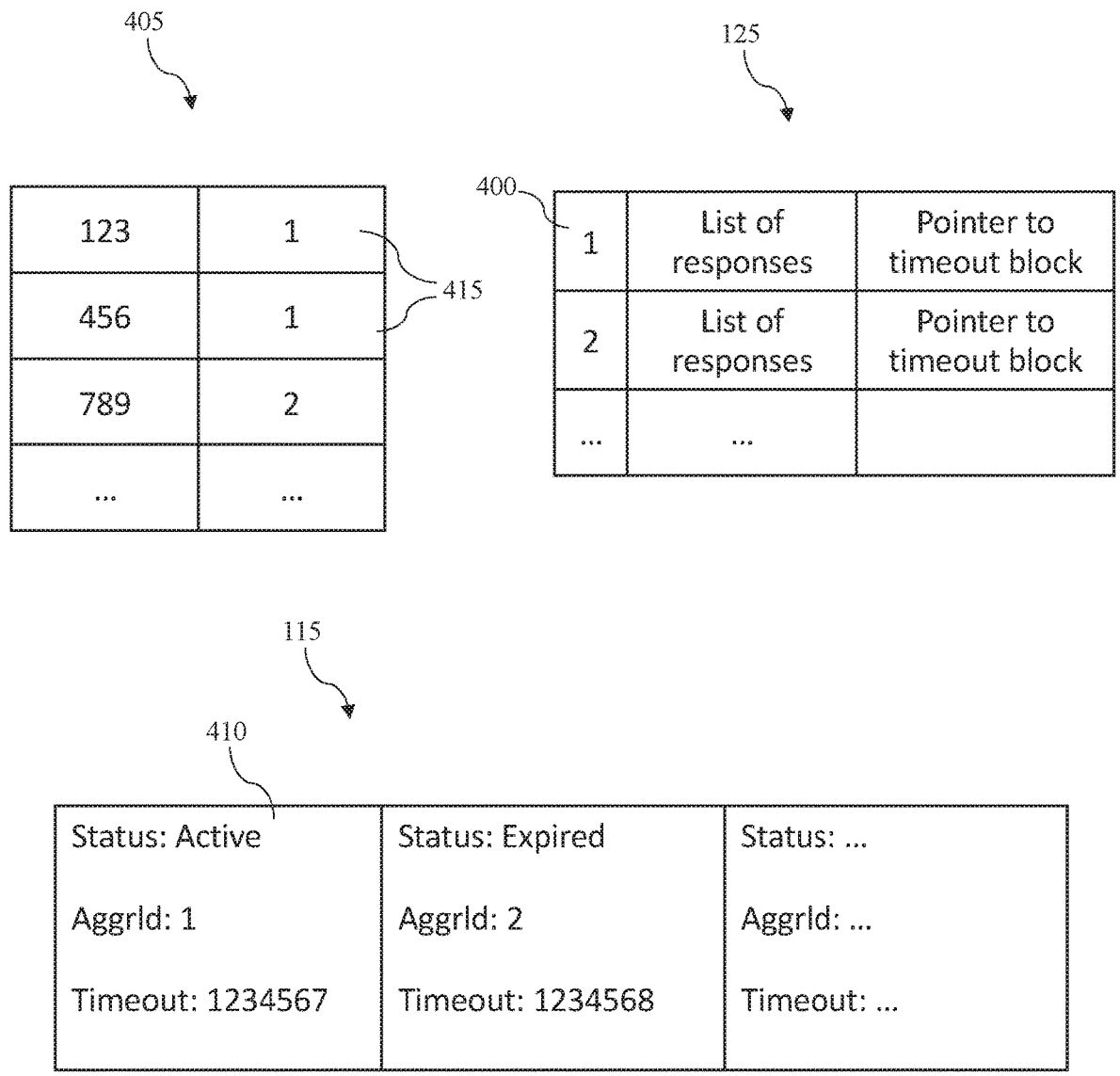
FIG. 4 illustrates an example diagram of in-memory data structures, in accordance with embodiments of the present disclosure.

Referring now to FIG. 4, there is shown an example diagram of in-memory data structures (115, 125 and 405), in accordance with embodiments of the present disclosure. It should be understood that although FIG. 4 has been described with reference to a plurality of data structures (115, 125 and 405), one or more data structures can be used in embodiments.

Figure 2:
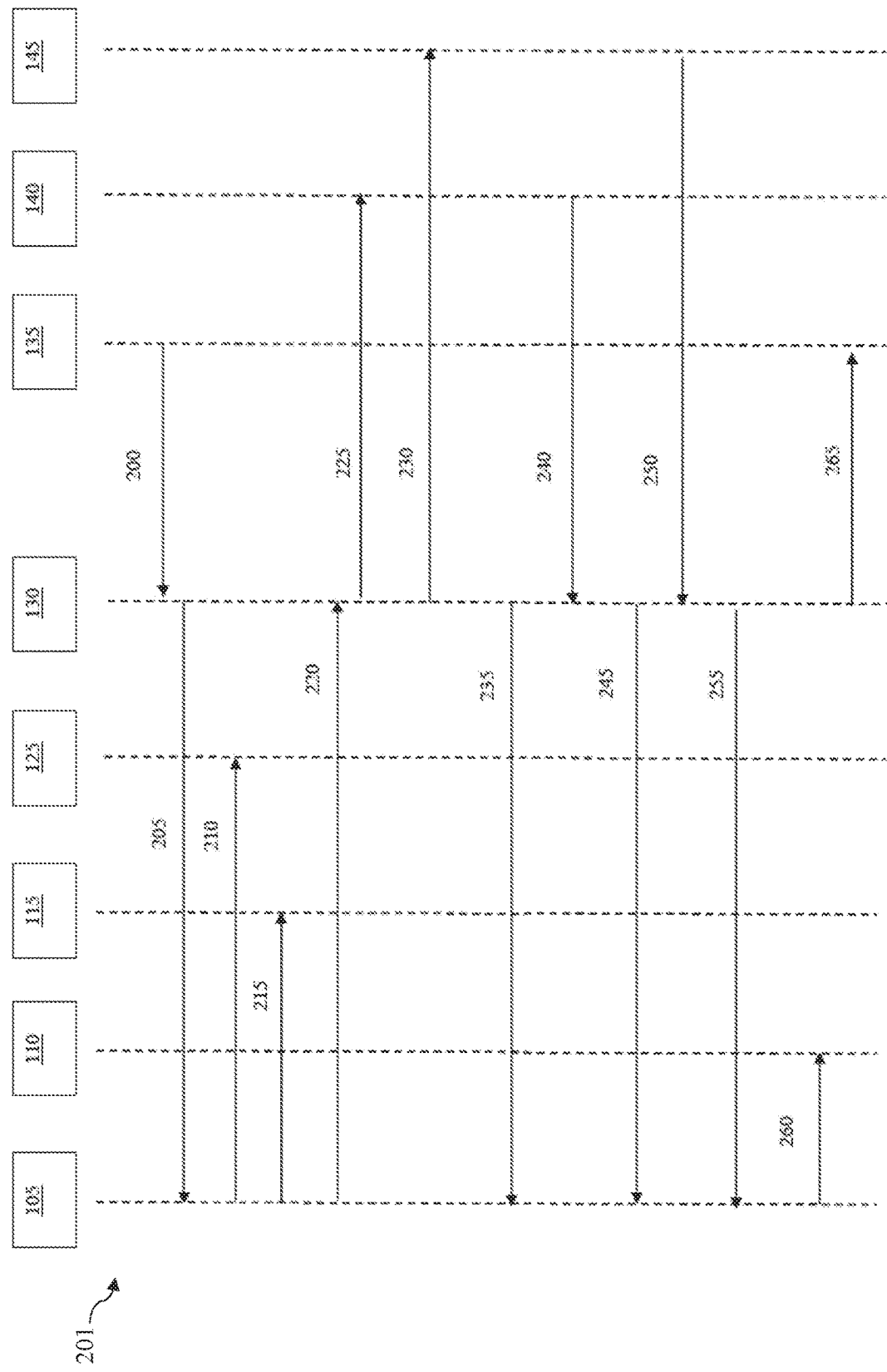
FIG. 2 illustrates a flow chart of an example process for a successful aggregation method, in accordance with embodiments of the present disclosure.

Referring now to FIG. 2, there is shown a flow chart of an example process 201 for a successful aggregation method, in accordance with embodiments of the present disclosure. In the illustrated embodiment, the first aggregation method completes successfully as the integration server 100 (as detailed in FIG. 1) receives expected responses from target applications prior to expiry of a timeout value, as will be described in more detail below. Further, FIG. 5 has been included to provide further clarity to the operational steps involved in process 201 of FIG. 2.

The process 201 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 201 is a computer-implemented process. In some embodiments, the process 201 may be performed by integration server 100 exemplified in FIG. 1.

In embodiments, the process 201 begins by Application-A 135 sending an input message to the integration engine 130. This is illustrated at step 200. For example, Application-A 135 sends the input message using a known request/response protocol. In the example herein, the input message comprises a JSON message represented as follows: "{'command': 'reportData'}".

The integration engine 130 generates a first aggregation ID having, in the example herein, a value of "1". The process 201 continues by the integration engine 130 calling the aggregator 105. This is illustrated at step 205.

In one example, the integration engine 130 calls (at step 205) a first node associated with the aggregator 105, passing the aggregator 105 the first aggregation ID. The integration engine 130 issues a first control signal (e.g., "update the data structures") to the aggregator 105, instructing the aggregator 105 to update the active list 125 and the timeout list 115.

At step 210 and with reference to FIG. 4, the aggregator 105 is operable to generate an aggregation entry 400. In some embodiments, the aggregation entry 400 comprises the first aggregation ID and a first structure for storing a first list of responses to the input message and a first pointer to a timeout block of the timeout list 115. The aggregator 105 uses a single logical thread in order to generate the aggregation entry 400.

At step 215, the aggregator 105 is operable to generate a first timeout block 410. In some embodiments, the first timeout block 410 comprises a status (denoted by the field, "Status") associated with the first aggregation method; the first aggregation ID 400 (denoted by the field, "AggrId"); and a timeout value (denoted by the field, "Timeout") associated with the first aggregation method. In the example herein, the status has a value of "Active"; the first aggregation ID has a value of "1" and the timeout value has a value of "1234567". The aggregator 105 uses the single logical thread in order to generate the first timeout block.

In the example herein, the aggregator 105 sets the first pointer in the active list 125 to point to the first timeout block 410 in the timeout list 115. At this stage, however, the first list of responses remains empty as no expected responses have yet been received from one or more target applications.

Advantageously, as the data structures 115 and 125 comprising, e.g., the aggregation entry 400 and the timeout block 410 are in-memory and are accessible to a single logical thread used by the aggregator 105, the aggregator 105 does not need to take CPU locks in order to update the data structures.

At step 220, the aggregator 105 sends the aggregation entry 400 to the integration engine 130, such that the integration engine 130 is operable to use the first entry at a later stage in the process of FIG. 2 to update the first list of responses as will be described herein.

The integration engine 130 (e.g., a second node associated with the integration engine 130) generates a first application request and a second application request and associates the first aggregation ID with the first application request and the second application request.

It should be understood that, in some embodiments, selection of particular target application to receive application or applications' requests is associated with a configuration of the integration engine 130 (e.g., based on data in the input message).

In the example herein, the integration engine 130 selects two target applications, namely, Application-B 140 and Application-C 145.

In some embodiments, each of the first and second application requests are compatible with the corresponding target applications. In an example herein, the first application request for Application-B 140 comprises an XML message represented as follows: "<getTemperature/>" and a second application request for Application-C 145 comprises a JSON message represented as follows: "{'report': 'humidity'}".

The integration engine 130 generates a first response identifier (e.g., "123") associated with a first response expected from Application-B 140 and sends (at step 225) the first response identifier and the first application request to Application-B 140. Further, the integration engine 130 generates a second response identifier (e.g., "456") associated with a second response expected from Application-C 145 and sends (at step 230) the second response identifier and the second application request to Application-C 145.

The integration engine 130 calls (at step 235) the aggregator 105 and passes the first aggregation ID, the first response identifier and the second response identifier to the aggregator 105. The integration engine 130 issues a second control signal (e.g., "add response identifiers to data structure and start the timer") to the aggregator 105, instructing the aggregator 105 to update each of the data structures (115, 125 and 405).

With reference to FIG. 4, the aggregator 105 associates the first response identifier and second response identifier with the first aggregation ID in order to create a second entry 415 in a third data structure 405. Further, the aggregator 105 adds the aggregation entry 400 (generated in step 210) to the active list 125. Further, the aggregator 105 adds the first timeout block 410 (generated in step 215) to the timeout list 115, which starts a timer. As the aggregator 105 is operable to use a single thread for executing the steps of 210 and 215, in order to generate an aggregation entry and timeout block, respectively, and for executing the subsequent steps of adding the generated aggregation entry and timeout block to the data structures 115 and 125, advantageously, other threads are prevented from viewing and/or modifying the data structures. This allows the data structures to be updated accurately by the aggregator 105.

Advantageously, as each of the data structures 115, 125 and 405 are in memory, the aggregator 105 does not need to take locks in order to update the data structures.

At step 240, Application-B 140 sends a first response to the integration engine 130 in response to the first application request. In the example herein, the first response comprises an XML message, e.g., "<temp>30</temp>" and the first response identifier, "123".

At step 245, the integration engine 130 calls the aggregator 105, passing the first aggregation ID, the first response and the first response identifier, and issues a third control signal (e.g., "add response message to the data structure") to the aggregator 105, instructing the aggregator 105 to update the active list 125.

The aggregator 105 uses the first response identifier to look up an associated aggregation ID in the third data structure 405. In response to finding the first aggregation ID and matching the first aggregation ID with the data received in step 245, the aggregator 105 determines that a first response associated with the first aggregation method has been received. In response to the determination, the aggregator 105 removes the first response identifier from the second entry 415. The aggregator 105 uses the first aggregation ID to look up the aggregation entry 400 in the active list 125. In response to finding the aggregation entry, the aggregator 105 adds the first response identifier and the first response to the first list of responses in the active list 125 to denote that the first response has been received.

Advantageously, as the active list 125 and the third data structure 405 are in memory, the aggregator 105 does not need to take locks in order to perform the look up, remove and add operations described with relation to FIG. 2.

Further, because the aggregator 105 is operable to execute a two-step look up (that is, of the third data structure 405 and the active list 125) in some embodiments, the aggregator 105 is able to perform lock free updates of each of the data structures independently.

At step 250, Application-C 145 sends a second response to the integration engine 130 in response to the second application request. In the example herein, the second response comprises a JSON message e.g., "{'humidity': 52}" and the second response identifier, "456".

At step 255, the integration engine 130 calls the aggregator 105, passing the first aggregation ID, the second response and the second response identifier, and issues a fourth control signal (e.g., "add response message to the data structure") to the aggregator 105, instructing the aggregator 105 to update the active list 125.

The aggregator 105 uses the second response identifier to look up an associated aggregation ID in the third data structure 405. In response to finding the first aggregation ID and matching the first aggregation ID with the data received in step 255, the aggregator 105 removes the second response identifier from the second entry 415. The aggregator 105 uses the first aggregation ID to look up the aggregation entry 400 in the active list 125. In response to finding the aggregation entry 400, the aggregator 105 adds the second response identifier and the second response to the first list of responses in the active list 125 to denote that the second response has been received.

The aggregator 105 determines that there are no more responses to be received based on a comparison of the first response identifier and the second response identifier with the data received in step 235.

In response to the determination, the aggregator 105 removes the aggregation entry 400 from the active list 125, which marks the first aggregation method as completing successfully. Advantageously, as the active list 125 is in memory, the aggregator 105 does not need to take locks in order to perform the removing operation.

It should be understood that step 245 and step 255 are operable to complete in the reverse order and thus, either step is able to complete the first aggregation method.

As the first aggregation method has completed successfully before expiration of the timeout value, at step 260, the aggregator 105 calls the timeout handler 110, passing the first pointer and sends the timeout handler 110 a fifth control signal (e.g., "cancel timeout") instructing the timeout handler 110 to update the timeout list 115.

In some embodiments, the timeout handler 110 uses the first pointer to look up the first timeout block 410 and marks the timeout value in the first timeout block 410 as having expired. The mark operation can be done without taking any locks, as the timeout list 115 is in memory. The timeout block may be subsequently deleted, for example, by a timeout processing thread.

The integration engine 130 uses the each of the first and second responses to construct a third response. In some embodiments, the third response comprises a format expected by Application-A 135 (e.g., an XML message; a JSON message; a binary format).

At step 265, the integration engine 130 sends the third response to Application-A 135.

Figure 3:
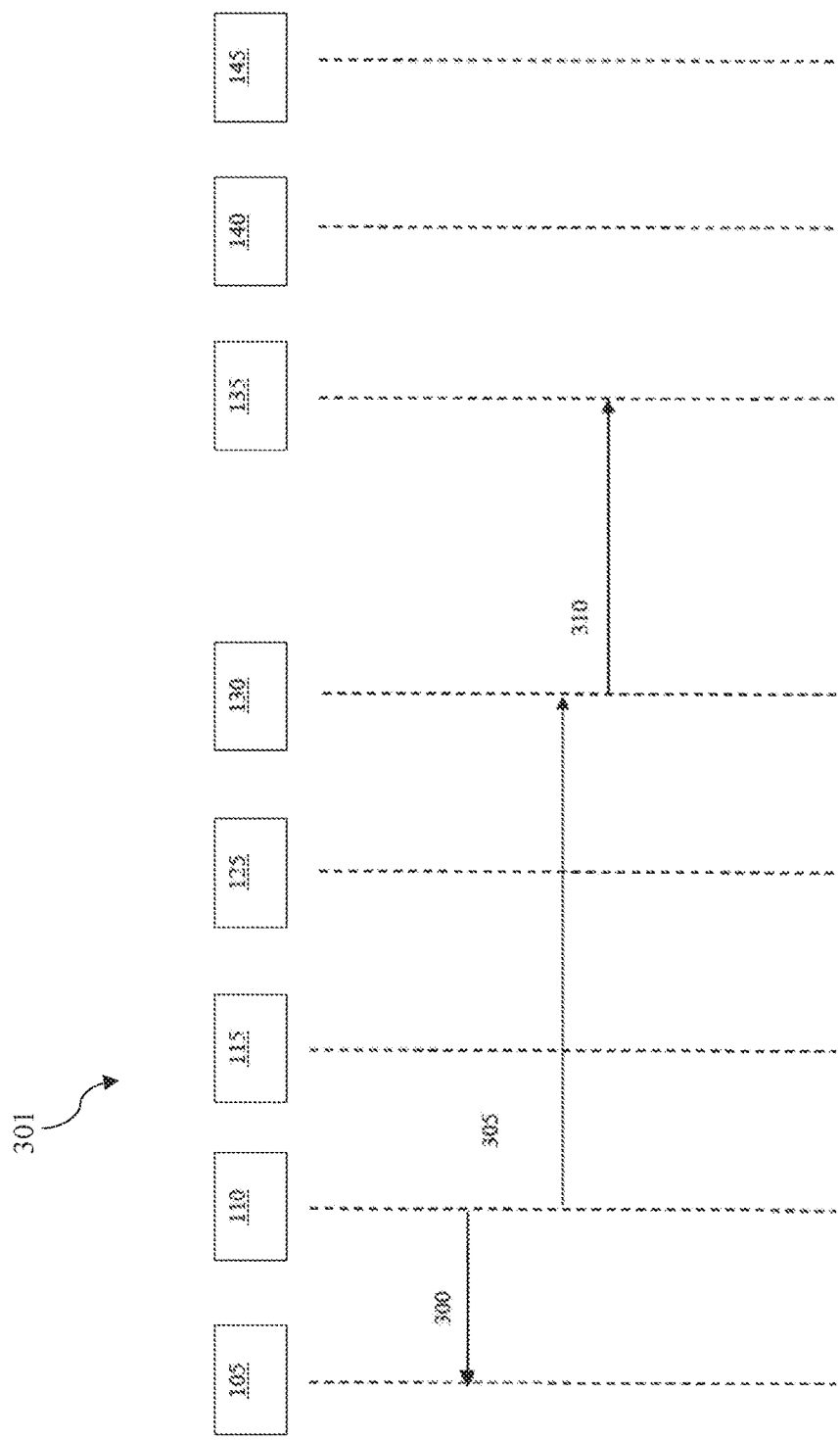
FIG. 3 illustrates a flow chart of an example process for an unsuccessful aggregation method, in accordance with embodiments of the present disclosure.

Referring now to FIG. 3, shown is a flow chart of an example process 301 for an unsuccessful aggregation method, in accordance with embodiments of the present disclosure. Preceding the steps of FIG. 3, steps 200 to 245 are executed as detailed with reference to FIG. 2.

Subsequently, at step 300 in FIG. 3, the timeout value expires and the integration engine 130 (detailed in FIG. 1) has not yet received a second response from Application-C 145. In response, the timeout handler 110 sends a fifth control signal (e.g., "time out the aggregation") and the first aggregation ID to the aggregator 105.

The aggregator 105 looks up the first aggregation ID in the active list 125 and marks the associated aggregation entry 400 (as detailed in FIG. 4) as being timed out. As the active list 125 is in memory, the aggregator 105 does not need to take locks in order to update the data structure.

At step 305, the timeout handler 110 sends the aggregation entry (which includes the first response identifier and the first response added by the aggregator 105 in response to step 245), to the integration engine 130.

The integration engine 130 uses only the first response to construct a fourth response which it sends (at step 310) to Application-A 135.

It should be understood that a second response from Application-C 145 may subsequently be received by the integration engine 130. However, the aggregator 105 is not able to update the active list 125 with the second response as the aggregator 105 had previously marked the associated aggregation entry 400 as having timed out in response to the fifth control signal. In some embodiments, the integration engine 130 discards the second response.

Figure 5:
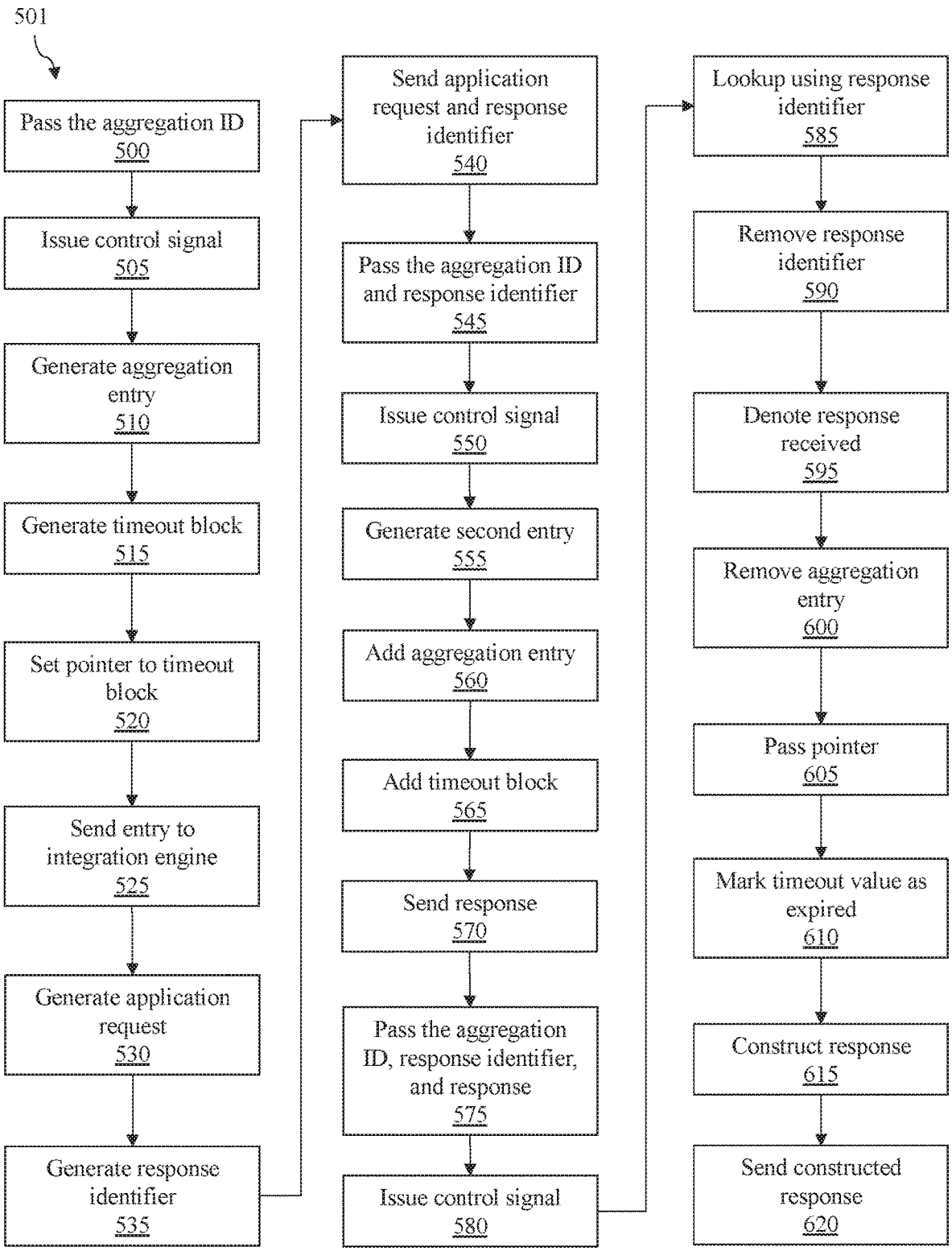
FIG. 5 illustrates a flow chart of an example process further detailing the operational steps depicted in FIG. 2, in accordance with embodiments of the present disclosure.

Referring now to FIG. 5, shown is a flow chart of an example process 501 further detailing the operational steps depicted in FIG. 2, in accordance with embodiments of the present disclosure. The process 501 described in FIG. 5 is used to aide in the understanding of the operational steps of FIG. 2. The process 501 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 501 is a computer-implemented process. In some embodiments, the process 501 may be performed by integration server 100 exemplified in FIG. 1.

With reference to step 200 of FIG. 2, Application-A 135 sends an input message to the integration engine 130. For example, Application-A 135 sends the input message using a known request/response protocol. In the example herein, the input message comprises a JSON message represented as follows: "{'command': 'reportData'}". The integration engine 130 generates a first aggregation ID having, in the example herein, a value of "1". The integration engine 130 calls (at step 205) the aggregator 105.

Once the integration engine 130 calls the aggregator 105, the process 501 begins by the integration engine 130 passing the first aggregation ID to the aggregator 105. This is illustrated at step 500.

Once the first aggregation ID is passed, the process 501 continues by the integration engine 130 issuing a first control signal (e.g., "update the data structures") to the aggregator 105, instructing the aggregator 105 to update the active list 125 and the timeout list 115. This is illustrated at step 505.

The process 501 continues by the aggregator 105 generating an aggregation entry 400 (as detailed in FIG. 4). This is illustrated at step 510. In some embodiments, the aggregation entry 400 comprises the first aggregation ID, a first structure for storing a first list of responses to the input message, and a first pointer to a timeout block of the timeout list 115. The aggregator 105 uses a single logical thread in order to generate the aggregation entry 400.

The process 501 continues by the aggregator 105 generating a first timeout block 410. This is illustrated at step 515. The first timeout block 410 may comprise a status (denoted by the field, "Status") associated with the first aggregation method; the first aggregation ID 400 (denoted by the field, "AggrId"); and a timeout value (denoted by the field, "Timeout") associated with the first aggregation method. In the example herein, the status has a value of "Active"; the first aggregation ID has a value of "1" and the timeout value has a value of "1234567". The aggregator 105 uses the single logical thread in order to generate the first timeout block.

The process 501 continues by the aggregator 105 setting the first pointer in the active list 125 to point to the first timeout block 410 in the timeout list 115. This is illustrated at step 520. At this stage, however, the first list of responses remains empty as no expected responses have yet been received from one or more target applications.

The process 501 continues by the aggregator 105 sending the aggregation entry 400 to the integration engine 130, such that the integration engine 130 is operable to use the first entry at a later stage in the process 501 to update the first list of responses as will be described herein. This is illustrated at step 525.

The process 501 continues by the integration engine 130 (e.g., a second node associated with the integration engine 130) generating a first application request and a second application request and associates the first aggregation ID with the first application request and the second application request. This is illustrated at 530.

It should be understood that selection of particular target applications to receive application requests may be associated with a configuration of the integration engine 130 (e.g., based on data in the input message).

In the example herein, the integration engine 130 selects two target applications, namely, Application-B 140 and Application-C 145.

Each of the first and second application requests may be compatible with the corresponding target applications. In an example herein, the first application request for Application-B 140 comprises an XML message represented as follows: "<getTemperature/>" and a second application request for Application-C 145 comprises a JSON message represented as follows: "{'report': 'humidity'}".

The process 501 continues by the integration engine 130 generating a first response identifier (e.g., "123") associated with a first response expected from Application-B 140 and sending the first response identifier and the first application request to Application-B 140. This is illustrated at step 535. The process 501 continues by the integration engine 130 generating a second response identifier (e.g., "456") associated with a second response expected from Application-C 145 and sending the second response identifier and the second application request to Application-C 145. This is illustrated at step 540.

The process 501 continues by the integration engine 130 calling the aggregator 105 and passing the first aggregation ID, the first response identifier and the second response identifier to the aggregator 105. This is illustrated at step 545.

The process 501 continues by the integration engine 130 issuing a second control signal (e.g., "add response identifiers to data structure and start the timer") to the aggregator 105, instructing the aggregator 105 to update each of the data structures (115, 125 and 405). This is illustrated at step 550.

With reference to FIG. 4, the process 501 continues by the aggregator 105 associating the first response identifier and second response identifier with the first aggregation ID in order to create a second entry 415 in a third data structure 405. This is illustrated at step 555.

The process 501 continues by the aggregator 105 adding the aggregation entry 400 to the active list 125. This is illustrated at step 560. The process 501 continues by the aggregator 105 adding the first timeout block 410 to the timeout list 115, which starts a timer. This is illustrated at step 565. As the aggregator 105 is operable to use a single thread for executing the steps of 210 and 215 detailed in FIG. 2, in order to generate an aggregation entry and timeout block, respectively, and for executing the subsequent steps of adding the generated aggregation entry and timeout block to the data structures 115 and 125, advantageously, other threads are prevented from viewing and/or modifying the data structures. This allows the data structures to be updated accurately by the aggregator 105.

Advantageously, as each of the data structures 115, 125 and 405 are in memory, the aggregator 105 does not need to take locks in order to update the data structures.

The process 501 continues by Application-B 140 sending a first response to the integration engine 130 in response to the first application request. This is illustrated at step 570. In the example herein, the first response comprises an XML message, e.g., "<temp>30</temp>" and the first response identifier, "123".

The process 501 continues by the integration engine 130 calling the aggregator 105 and passing the first aggregation ID, the first response and the first response identifier. This is illustrated at step 575. The process 501 continues by the integration engine 130 issuing a third control signal (e.g., "add response message to the data structure") to the aggregator 105, instructing the aggregator 105 to update the active list 125. This is illustrated at step 580.

The process 501 continues by the aggregator 105 using the first response identifier to look up an associated aggregation ID in the third data structure 405. This is illustrated at step 585. In response to finding the first aggregation ID and matching the first aggregation ID with the data received, the aggregator 105 determines that a first response associated with the first aggregation method has been received.

In response to the determination, the process 501 continues by the aggregator 105 removing the first response identifier from the second entry 415. This is illustrated at step 590. The aggregator 105 uses the first aggregation ID to look up the aggregation entry 400 in the active list 125. In response to finding the aggregation entry, the aggregator 105 adds the first response identifier and the first response to the first list of responses in the active list 125 to denote that the first response has been received. This is illustrated at step 595.

Advantageously, as the active list 125 and the third data structure 405 are in memory, the aggregator 105 does not need to take locks in order to perform the look up, remove and add operations described herein.

Further, in embodiments where the aggregator 105 is operable to execute a two-step look up (that is, of the third data structure 405 and the active list 125), the aggregator 105 is able to perform lock free updates of each of the data structures independently.

With reference back to step 570, Application-C 145 sends a second response to the integration engine 130 in response to the second application request. In the example herein, the second response comprises a JSON message e.g., "{'humidity': 52}" and the second response identifier, "456".

The integration engine 130 calls the aggregator 105, passing the first aggregation ID, the second response and the second response identifier, and issuing a fourth control signal (e.g., "add response message to the data structure") to the aggregator 105, instructing the aggregator 105 to update the active list 125. This is illustrated at steps 575 and 580, respectively.

The aggregator 105 uses the second response identifier to look up an associated aggregation ID in the third data structure 405. This is illustrated at step 585. In response to finding the first aggregation ID and matching the first aggregation ID with the data received in step 580, the process 501 continues by the aggregator 105 removing the second response identifier from the second entry 415. This is illustrated at step 590. The aggregator 105 uses the first aggregation ID to look up the aggregation entry 400 in the active list 125. In response to finding the aggregation entry 400, the aggregator 105 adds the second response identifier and the second response to the first list of responses in the active list 125 to denote that the second response has been received. This is illustrated at step 595.

The aggregator 105 determines that there are no more responses to be received based on a comparison of the first response identifier and the second response identifier with the data received in step 545. In response to the determination, the process continues by the aggregator 105 removing the aggregation entry 400 from the active list 125, which marks the first aggregation method as completing successfully. This is illustrated at step 600. Advantageously, as the active list 125 is in memory, the aggregator 105 does not need to take locks in order to perform the removing operation.

As the first aggregation method has completed successfully before expiration of the timeout value, the process 501 continues by the aggregator 105 calling the timeout handler 110, passing the first pointer and sends the timeout handler 110 a fifth control signal (e.g., "cancel timeout") instructing the timeout handler 110 to update the timeout list 115. This is illustrated at step 605.

In some embodiments, the timeout handler 110 uses the first pointer to look up the first timeout block 410 and marks the timeout value in the first timeout block 410 as having expired. This is illustrated at step 610. The mark operation can be done without taking any locks, as the timeout list 115 is in memory. Preferably, the timeout block is subsequently deleted e.g., by a timeout processing thread.

The process 501 continues by the integration engine 130 uses the each of the first and second responses to construct a third response. This is illustrated at step 615. Preferably, the third response comprises a format expected by Application-A 135 (e.g., an XML message; a JSON message; a binary format).

The process 501 continues by the integration engine 130 sending (820) the third response to Application-A 135. This is illustrated at step 620.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual Application-Capabilities, with the possible exception of limited user-specific Application-Configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
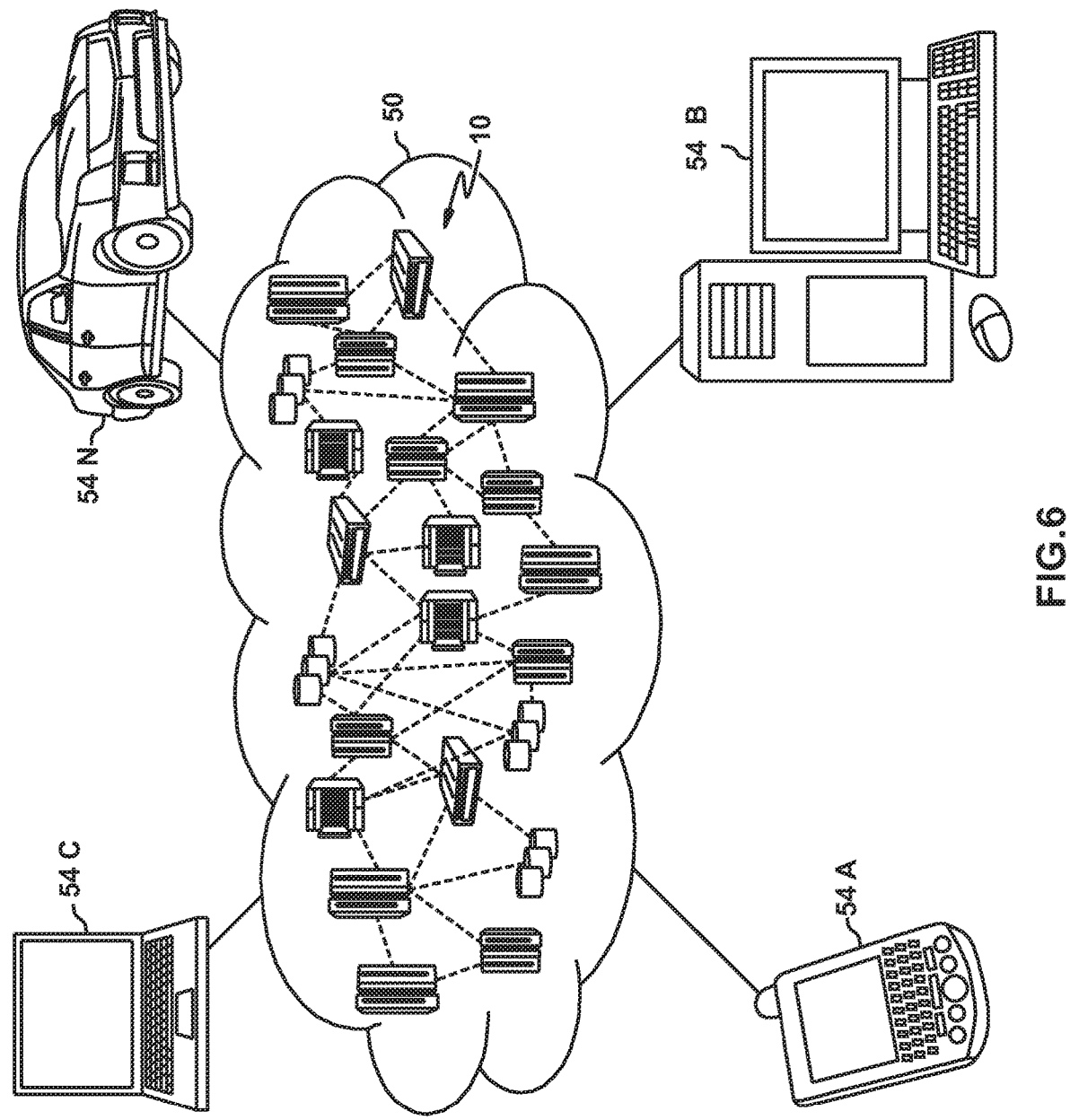
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
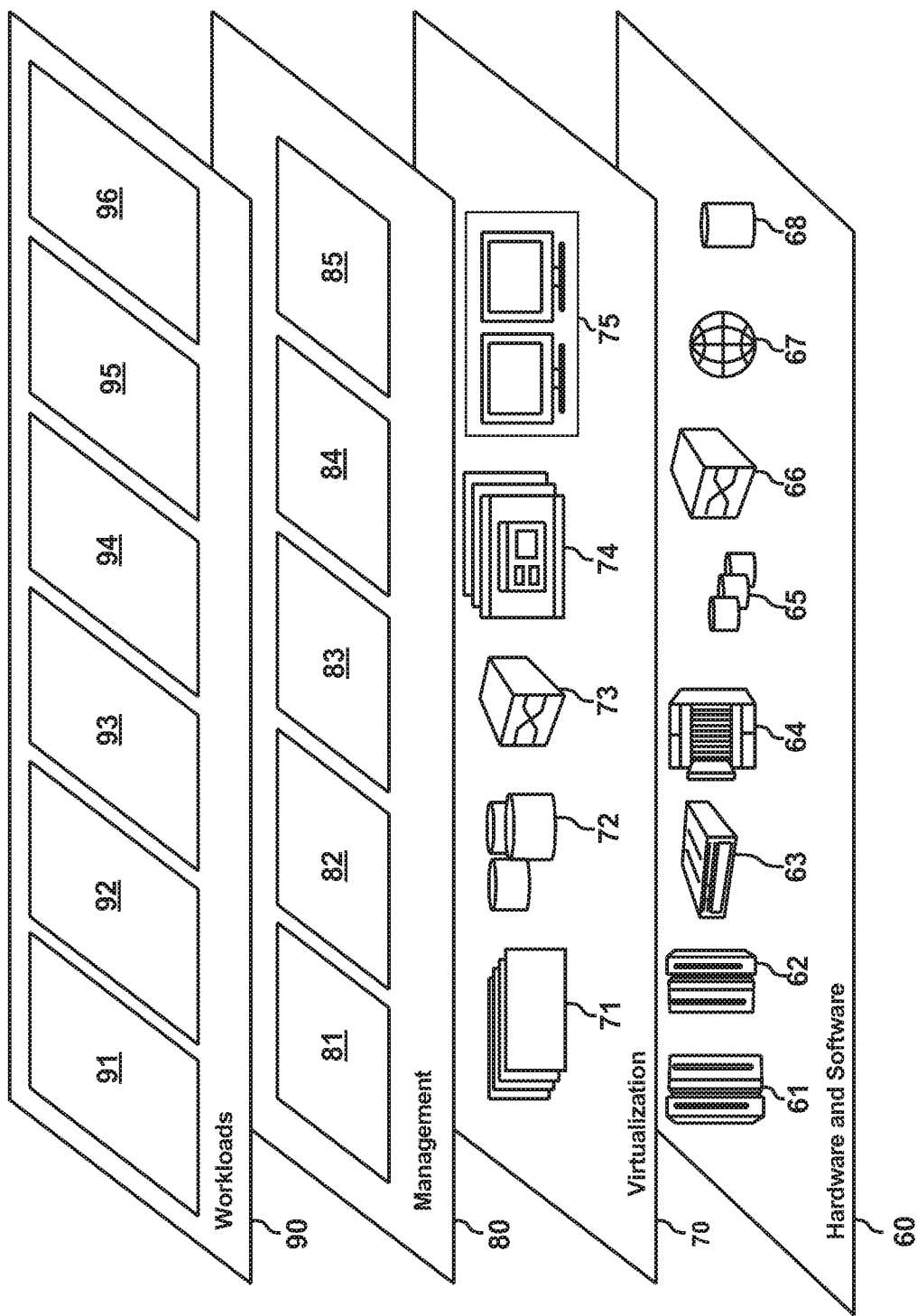
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

Figure 8:
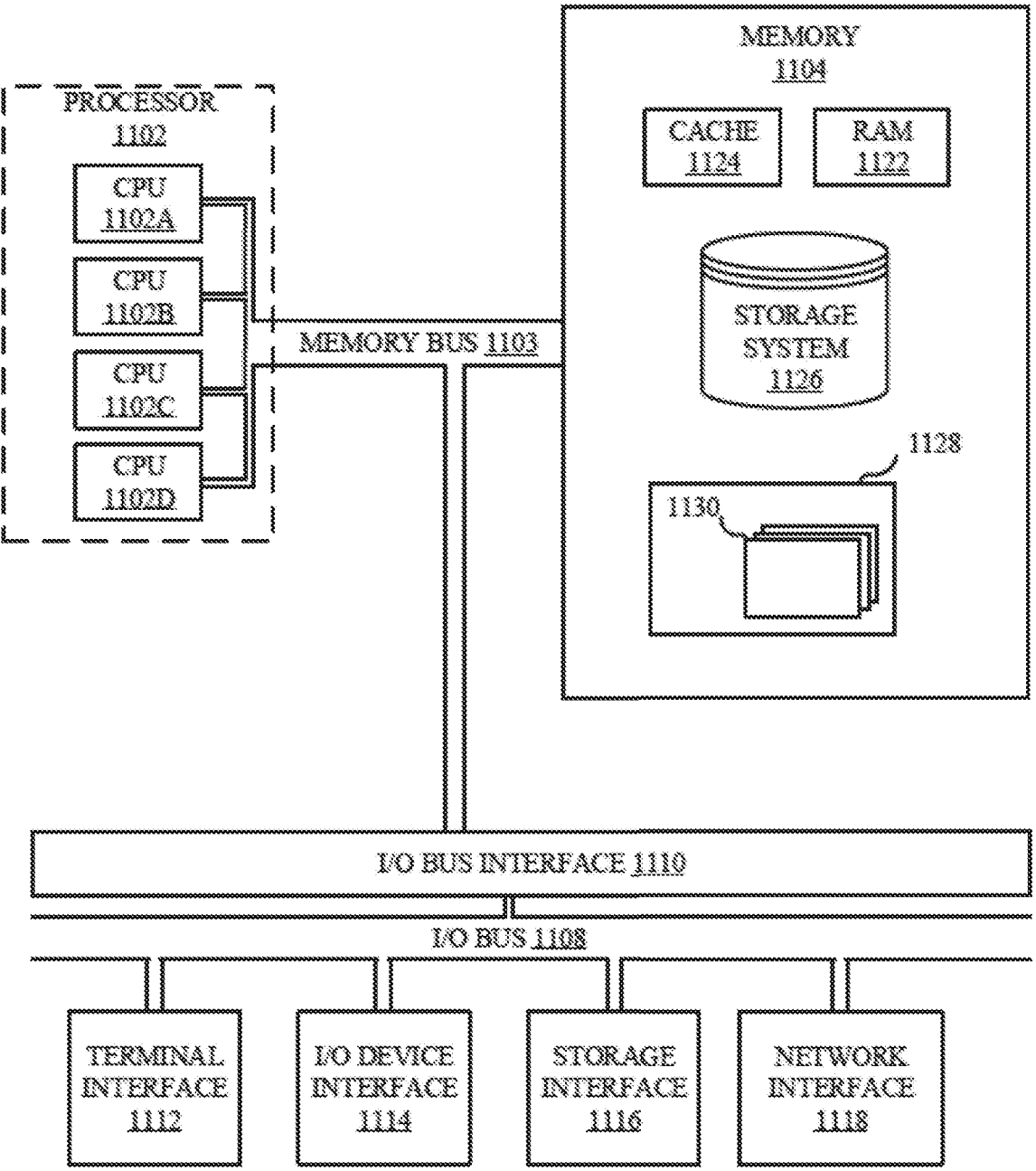
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 201, 301, and 501).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 8 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 1101. In some embodiments, however, individual components may have greater or lesser complexity than as represented in FIG. 8, components other than or in addition to those shown in FIG. 8 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for executing an aggregation method in an integration environment, comprising:
   a processor, responsive to receiving an input message from a requesting application, for issuing a first control signal to an aggregator, wherein the aggregator, responsive to receiving the first control signal, is operable to use a first logical thread to:
   generate an entry associated with an in-memory data structure, wherein the entry comprises an aggregation identifier associated with the input message and a response identifier associated with a response message associated with a target application, wherein no mutual-exclusion locks are applied by the aggregator;
   determine that the response message has been received by comparing the response identifier with a corresponding response identifier received from the target application;
   update, in response to receiving the response message from the target application, the entry in a second logical thread with the response message; and
   add the updated entry to the in-memory data structure, wherein no mutual-exclusion locks are applied by the aggregator.

2. The apparatus of claim 1, wherein the entry further comprises a timeout value associated with the aggregation method.

3. The apparatus of claim 2, wherein the aggregator, responsive to the response message being received prior to the timeout value expiring, is operable to mark the aggregation method associated with the entry as completing successfully.

4. The apparatus of claim 2, further comprising a timeout handler for, responsive to the response message being received prior to the timeout value expiring, marking the timeout value as expiring.

5. The apparatus of claim 1, wherein the aggregator is operable to send the entry to the processor.

6. The apparatus of claim 5, wherein the processor is operable to send the response message to the requesting application.

7. The apparatus of claim 5, wherein the processor is operable to aggregate a further response message with the response message for sending to the requesting application.

8. The apparatus of claim 1, wherein the processor is operable to generate the response identifier and send the response identifier to the target application.

9. The apparatus of claim 2, wherein the aggregator, responsive to the response message not being received prior to the timeout value expiring, is operable to mark the aggregation method associated with the entry as timed out, wherein no mutual-exclusion locks are applied by the aggregator.

10. A computer implemented method for executing an aggregation method in an integration environment, the method comprising:
    issuing, in response to receiving an input message from a requesting application, a first control signal, using, in response to receiving the first control signal, a first logical thread to:
    generate an entry associated with an in-memory data structure, wherein the entry comprises an aggregation identifier associated with the input message and a response identifier associated with a response message associated with a target application, wherein no mutual-exclusion locks are applied by an aggregator;
    determine, by the aggregator, that the response message has been received by comparing the response identifier with a corresponding response identifier received from the target application;
    update, in response to receiving the response message from the target application, the entry in a second logical thread with the response message; and
    add the updated entry to the in-memory data structure, where no mutual-exclusion locks are applied are applied by the aggregator.

11. The method of claim 10, wherein the entry further comprises a timeout value associated with the aggregation method.

12. The method of claim 11, further comprising:
    marking, in response to the response message being received prior to the timeout value expiring, the aggregation method associated with the entry as completing successfully.

13. The method of claim 11, further comprising:
    marking, in response to the response message being received prior to the timeout value expiring, the timeout value as expiring.

14. The method of claim 10, further comprising:
    sending the entry to an integration engine.

15. The method of claim 14, further comprising:
    sending, by the integration engine, the response message to the requesting application.

16. The method of claim 14, further comprising:
    aggregating a further response message with the response message for sending to the requesting application.

17. The method of claim 10, further comprising:
    generating the response identifier and sending the response identifier to the target application.

18. The method of claim 11, further comprising:
    marking, in response to the response message not being received prior to the timeout value expiring, the aggregation method associated with the entry as timed out.

19. A computer program product comprising a computer-readable storage medium having program instructions embodied therewith, wherein the computer-readable storage medium is not a transitory signal per se, the program instructions executable by a processor to cause the processor to perform a method comprising:
    issuing, in response to receiving an input message from a requesting application, a first control signal, using, in response to receiving the first control signal, a first logical thread to:

generate an entry associated with an in-memory data structure, wherein the entry comprises an aggregation identifier associated with the input message and a response identifier associated with a response message associated with a target application, wherein no mutual-exclusion locks are applied by an aggregator;

update, in response to receiving the response message from the target application, the entry in a second logical thread with the response message;

mark, by the aggregator and responsive to the response message being received prior to a timeout value expiring, an aggregation method associated with the entry as completing successfully; and add the updated entry to the in-memory data structure, wherein no mutual-exclusion locks are applied by the aggregator.

20. The computer program product of claim 19, wherein one or more other logical threads are prevented from modifying the in-memory data structure.

\* \* \* \* \*